3,055,941
PROCESS OF PREPARING SUBSTITUTED
HYDRAZINE DERIVATIVES
Hugh W. Stewart, Woodbury, Conn., assignor to United
States Rubber Company, New York, N.Y., a corporation of New Jersey
No Drawing. Filed Dec. 31, 1958, Ser. No. 784,017
5 Claims. (Cl. 260—583)

This invention relates to improvements in a process for adding hydrocarbon substituents to hydrazine, or substituted hydrazine, in order to produce poly substituted hydrazine derivatives. The improvement consists in reacting hydrazine, or substituted hydrazine, with an organic halide selected from the group consisting of primary alkyl and aralkyl bromide and iodide, allyl, aralkyl, and propargyl chloride in the presence of an alkali-metal hydride in an inert organic solvent.

Direct alkylation of hydrazine with any of the known alkylating agents, such as dialkylsulfates, alkyl iodides, and alkyl bromides, usually will produce azinium salts instead of the alkyl hydrazines. The mono and 1,1-dialkyl hydrazines are the intermediate products of such alkylations. These intermediates are very hard to isolate because the entering alkyl group is preferentially attracted to the nitrogen atom of the hydrazine nucleus which already contains one or two alkyl groups. Also, it has been reported that moderate yields of trialkyl substituted hydrazine can be obtained by heating equal molar quantities of hydrazine and an alkyl chloride to a temperature of 150–160° C. for several hours [see Ber., 74B, 759–776 (1941)].

I have found a new way to add hydrocarbon substituents directly to hydrazine, or substituted hydrazine by the reaction represented as follows:

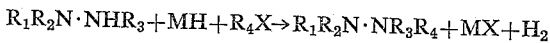

$R_1$, $R_2$ and $R_3$=alkyl, aryl, aralkyl or cycloalkyl radicals containing from 1 to 18 carbon atoms, or hydrogen atoms; M=an alkali metal; $R_4X$=primary alkyl bromide or iodide, primary aralkyl bromide or iodide, allyl chloride, aralkyl chloride, or propargyl chloride, where $R_4$ contains from 1 to 18 carbon atoms.

The reaction is carried out at atmospheric pressure in an open reaction vessel, or under autogenous pressure in a closed reaction vessel. The selection of suitable apparatus depends upon the volatility and reactivity of the reactants.

The temperatures may range from about −20° C. to about 200° C. and will vary with the particular reactants and solvent used. Normally the temperature should not exceed the boiling point of the solvent, e.g., a temperature of from 70° C. to 85° C. will suffice when using an ether solvent, such as ethylene glycol dimethyl ether, containing sodium hydride. At atmospheric pressure the temperatures generally will range from 20° C. to 100° C.

The organic solvent medium must be relatively inert. By inertness I mean that the organic solvent must contain inactive hydrogen atoms under the reactive conditions. Solvents such as dimethylformamide, dioxane, tetrahydrofuran, toluene, xylene, ethylene glycol dimethyl ether, and di- or polyethylene glycol dimethyl ether are suitable. However, I prefer to use ethylene glycol dimethyl ether because of its desirable properties.

Sodium hydride is the preferred alkali-metal hydride although other metal hydrides, such as potassium or lithium hydride, may be employed. I have found it advantageous to use the alkali-metal hydride as a dispersion in refined mineral oil in order to keep it in a finely divided state. A dispersion of sodium hydride in "Bayol-85" is marketed by Metal Hydrides Incorporated.

The hydrazine and/or the organic halide is prefer-ably added to the reaction zone after the mixture of alkali-metal hydride and solvent. I have found that improved yields can be obtained in some cases by using a molar excess of organic halide, e.g., the quantity of organic halide is about 100% more than the quantity of hydrazine, or substituted hydrazine.

The following examples are given to illustrate my invention, without confining thereto.

*Example 1*

Ethylene glycol dimethyl ether (100 cc.) was added to 26.5 grams of a 27% mineral oil dispersion of 7.2 grams of sodium hydride (0.3 mole). After heating to the refluxing temperature, 85–90° C., 28.8 grams of 1,1-di-n-butylhydrazine (0.2 mole) was added in about 5 minutes. Then 27.4 grams of n-butyl bromide (0.2 mole) was added in about 5 minutes. The reflux condenser outlet was connected to a bubble trap so that the evolution of gas could be detected. The reaction slurry was stirred at the refluxing temperature for several hours until most of the evolution of gases had ceased. The reaction slurry was cooled below 65° C. and the excess sodium hydride was destroyed by the slow addition of 3.5 grams of methyl alcohol. The insoluble inorganic salts were removed by filtration and washing of the filter cake. The filtrate, after removal of most of the solvent, was fractionally distilled through a fractionating column under reduced pressure. The yield of 1,1,2-tri-n-butylhydrazine was 21.7 grams (54%). The recovery of 1,1-di-n-butylhydrazine was 13%.

*Example 2*

Ethylene glycol dimethyl ether (100 cc.) was added to 37.6 grams of a 48.9% mineral oil dispersion of 18.5 grams of sodium hydride (0.77 mole). Then, 135 grams of n-octyl bromide (0.7 mole) was added and the reaction slurry was heated to 80° C. During 1½ hours, 46.2 grams of 1,1-dimethylhydrazine (0.77 mole) was slowly added. The reaction slurry was maintained at the refluxing temperature of 82–86° C. for several hours until the gas evolution had ceased. The product was isolated as in Example 1. The yield of 1,1-dimethyl-2-n-octyl-hydrazine, confirmed by carbon, hydrogen and nitrogen analyses, was 57.5 grams; 47.7%; $n_D^{27}$ 1.4310; B.P. 103–105° C./19.5 mm. There was also isolated a 27% yield of 1-octene.

*Example 3*

Ethylene glycol dimethyl ether (250 cc.) was added to 53.8 grams of a 48.9% mineral oil dispersion of 26.4 grams of sodium hydride (1.1 moles). Then, 66.1 grams of 1,1-dimethylhydrazine (1.1 moles) was added at 25° C. The reaction slurry was heated to 70° C. and 126.6 grams of benzyl chloride (1.0 mole) was slowly added in 1 hour. After heating at a refluxing temperature (82–85° C.) for several hours, the evolution of gases had ceased. The product was isolated as in Example 1. Besides other products there was obtained 40.1 grams of pure 1-benzyl-2,2-dimethylhydrazine, B.P. 88–89° C./10 mm.; 26.7%; $n_D^{27}$ 1.5130.

*Example 4*

Dry ethylene glycol dimethyl ether (100 cc.) was added to 19.6 grams of a 48.9% oil dispersion of 9.6 grams of sodium hydride (0.4 mole). The reaction slurry was heated to the refluxing temperature, 82–85° C., and 24.0 grams of 1,1-dimethylhydrazine (0.4 mole) and 100 grams of n-octadecyl bromide (0.3 mole) were added simultaneously in ½ hour. The reaction slurry was heated at the refluxing temperature for several hours until the evolution of gas had essentially ceased. The product, isolated as in Example 1, also contained 1-octadecene, B.P. of mixture 78–160° C./1 mm. The 1,1-dimethyl-2-n-octadecylhydrazine was separated from the 1-octadecene by preparation of its monohydrochloride in diethyl ether wtih anhydrous hydrogen chloride and purified by crystallization from ethyl acetate; yield, 51%; M.P. 86–87° C. The yield of 1-octadecene was 26%.

*Example 5*

Dimethylformamide (100 cc.) was added to 37.6 g. of a 48.99 mineral oil dispersion of 18.5 g. of sodium hydride (0.77 mole). Then 135 g. of n-octylbromide (0.7 mole) was added. During ½ hour, 46.2 g. of 1,1-dimethyl hydrazine was added slowly while stirring, keeping the temperature at 55–60° C. by cooling. The reaction mixture was heated at 70–75° C. for 3 hours, and subsequently at 85° C. for four hours. There was no further evolution of gas. The product was isolated as in Example 1. The yield of 1,1-dimethyl-2-n-octylhydrazine was 32%.

*Example 6*

Ethylene glycol dimethyl ether (100 moles) was added to 80.6 g. of a 48.9% high boiling hydrocarbon oil dispersion of 39.6 g. of sodium hydride (1.65 moles). While stirring, 15.0 g. of anhydrous hydrazine (0.47 mole) was added slowly in 10 minutes at 27° C. with vigorous evolution of gases. Then while cooling, 126 g. of n-butylbromide (0.92 mole) was added slowly at 30–35° C. in forty-five minutes. After stirring at 25–30° C. for several hours, the product was isolated as in Example 1. The yield was 20.4 g. of 1,1-di-n-butylhydrazine, 30.8%.

*Example 7*

Ethylene glycol dimethyl ether (100 moles) was added to 62.2 g. of a 27% mineral oil dispersion of 16.8 g. of sodium hydride (0.7 mole). At room temperature, 43.3 g. of 1,1-di-n-butylhydrazine (0.3 mole) was added, producing no exotherm. After heating to the refluxing temperature, 92° C., 90.4 g. of n-butyl bromide (0.66 mole) was added in about 10 minutes. The reaction slurry was stirred at the refluxing temperature for several hours until most of the evolution of gases had ceased. The product was isolated as in Example 1. The yield of tri-n-butylhydrazine was 47.5 g. (79.2%). There was also obtained 4.7 g. (6%) of tetra-n-butylhydrazine.

Having thus described my invention, what I claim and desire to protect by Letters Patent is:

1. A method of preparing substituted hydrazine derivatives which comprises reacting a chemical represented by the formula $R_1R_2N \cdot NHR_3$, wherein $R_1$ and $R_2$ are alkyl radicals containing from 1 to 18 carbon atoms and $R_3$ is a member selected from the group consisting of alkyl radicals containing from 1 to 18 carbon atoms and a hydrogen atom with an organic halide containing from 1 to 18 carbon atoms and which is selected from the group consisting of primary alkyl and aralkyl bromide and iodide, allyl, aralkyl and propargyl chloride in the presence of an alkali-metal hydride selected from the group consisting of sodium hydride, potassium hydride and lithium hydride in an organic solvent selected from the group consisting of dimethylformamide, dioxane, tetrahydrofuran, alkylated benzene hydrocarbons, and dialkyl ethers of alkylene glycols at a temperature in the range of from —20° C. to 200° C.

2. The method of claim 1 wherein the organic halide is a member selected from the group consisting of n-butylbromide, n-octylbromide, n-octadecylbromide and benzyl chloride.

3. A method of preparing substituted hydrazine derivatives which comprises reacting a chemical represented by the formula $R_1R_2N \cdot NHR_3$, wherein $R_1$ and $R_2$ are alkyl radicals containing from 1 to 18 carbon atoms and $R_3$ is a member selected from the group consisting of alkyl radicals containing from 1 to 18 carbon atoms and and a hydrogen atom, with an organic halide containing from 1 to 18 carbon atoms and which is selected from the group consisting of primary alkyl and aralkyl bromide and iodide, allyl, aralkyl and propargyl chloride in the presence of an alkali-metal hydride selected from the group consisting of sodium hydride, potassium hydride and lithium hydride in an inert organic solvent.

4. A method of preparing substituted hydrazine derivatives which comprises reacting a chemical represented by the formula $R_1R_2N \cdot NHR_3$, wherein $R_1$ and $R_2$ are alkyl radicals containing from 1 to 18 carbon atoms and $R_3$ is a member selected from the group consisting of alkyl radicals containing from 1 to 18 carbon atoms and and a hydrogen atom with an organic halide containing from 1 to 18 carbon atoms and which is selected from the group consisting of primary alkyl and aralkyl bromide and iodide, allyl, aralkyl and propargyl chloride in the presence of an alkali-metal hydride selected from the group consisting of sodium hydride, potassium hydride and lithium hydride, in ethylene glycol dimethyl ether at a temperature in the range of from 70° C. to 85° C.

5. A method which comprises reacting 1,1-dimethylhydrazine with n-octylbromide in the presence of sodium hydride in ethylene glycol dimethyl ether at a temperature in the range of from 70° C. to 85° C.

References Cited in the file of this patent

Gaylord: "Reduction With Complex Metal Hydrides," pages 787–790 (1956).

Westphal: "Berichte Deut. Chem.," vol. 74, pages 759–776 (1941), page 776 relied on.

(Copies in Patent Office Library.)